United States Patent
Low et al.

(10) Patent No.: US 8,705,408 B2
(45) Date of Patent: Apr. 22, 2014

(54) IDENTIFYING A WIRELESS NETWORK DEVICE ACROSS FACTORY RESETS

(75) Inventors: Aidan N. Low, Seattle, WA (US); Siddhartha Dattagupta, Irvine, CA (US); Mike Mouawad, Laguna Hills, CA (US); Aaron H. Averbuch, Seattle, WA (US)

(73) Assignee: Cisco Technology Inc., San Jose, CA (US)

( * ) Notice: Subject to any disclaimer, the term of this patent is extended or adjusted under 35 U.S.C. 154(b) by 199 days.

(21) Appl. No.: 13/228,551

(22) Filed: Sep. 9, 2011

(65) Prior Publication Data

US 2013/0064132 A1 Mar. 14, 2013

(51) Int. Cl.
*H04L 12/28* (2006.01)
*G06F 15/177* (2006.01)

(52) U.S. Cl.
USPC ............ 370/255; 370/463; 709/221; 709/250

(58) Field of Classification Search
None
See application file for complete search history.

(56) References Cited

U.S. PATENT DOCUMENTS

| | | | | |
|---|---|---|---|---|
| 2005/0070279 | A1* | 3/2005 | Ginzburg et al. | 455/434 |
| 2008/0101258 | A1* | 5/2008 | Cheng | 370/254 |
| 2010/0260069 | A1* | 10/2010 | Sakamoto et al. | 370/254 |
| 2012/0230305 | A1* | 9/2012 | Barbu et al. | 370/338 |

* cited by examiner

*Primary Examiner* — Yemane Mesfin
*Assistant Examiner* — Christine Duong
(74) *Attorney, Agent, or Firm* — Patterson & Sheridan, LLP

(57) ABSTRACT

Techniques are presented for discovering a previously configured network device. In one embodiment, a basic service set identification (BSSID) that uniquely identifies a network device (i.e., a router) is saved when the network device or a client device is configured. The stored BSSID indicates that the network device has previously been configured. After the network device is reset—i.e., one or more user-configurable settings return to their default settings—a client device may execute a setup application to reconfigure the network device. The setup application may compare the BSSID being broadcasted by the network device with the BSSID stored in the memory. If the BSSIDs match, the setup application may automatically select the network device without user input. Because the network device was previously configured, the setup application assumes that the user is attempting to reconfigure the network device after it has been reset.

18 Claims, 5 Drawing Sheets

IDENTIFYING A WIRELESS NETWORK DEVICE ACROSS FACTORY RESETS

TECHNICAL FIELD

Embodiments presented in this disclosure generally relate to detecting a previously configured network device.

BACKGROUND

Many users have limited knowledge of the technical aspects of computer networking, and consequently, have difficulty configuring secure wireless networks. A typical private network may include one or more computing devices, a common network device such as a router, and a connection to a wide access network (WAN). Configuring the private network typically requires two phases: configuring the different settings and functionalities of the network device and configuring one or more computing devices to connect to the network device. To aid in this process, many manufactures of network devices provide a setup application that guides a user through these steps. Depending upon the particular devices and existing network configuration, configuring a private network may require the user to input one or more of the following identifiers and passwords: web address of the router (e.g., 192.168.0.1, etc.), an administrative username and password, a network name or service set identifier (SSID) (i.e., a name that identifies a wireless LAN and may have up to 32 characters), a network password (i.e., security key or passphrase), and a media access control (MAC) address (i.e., a unique identifier assigned to a network adapter or network interface card, often referred to as a physical address).

After both the network device and the first computing device are configured, the network device may be reset such that it loses some or all of its settings. However, once the setup application is again executed to configure the router, it does not know whether the router has previously been configured. That is, the setup application treats a router that was reset similar to a brand new router that has never been configured.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

DESCRIPTION

Overview

Figure 1:
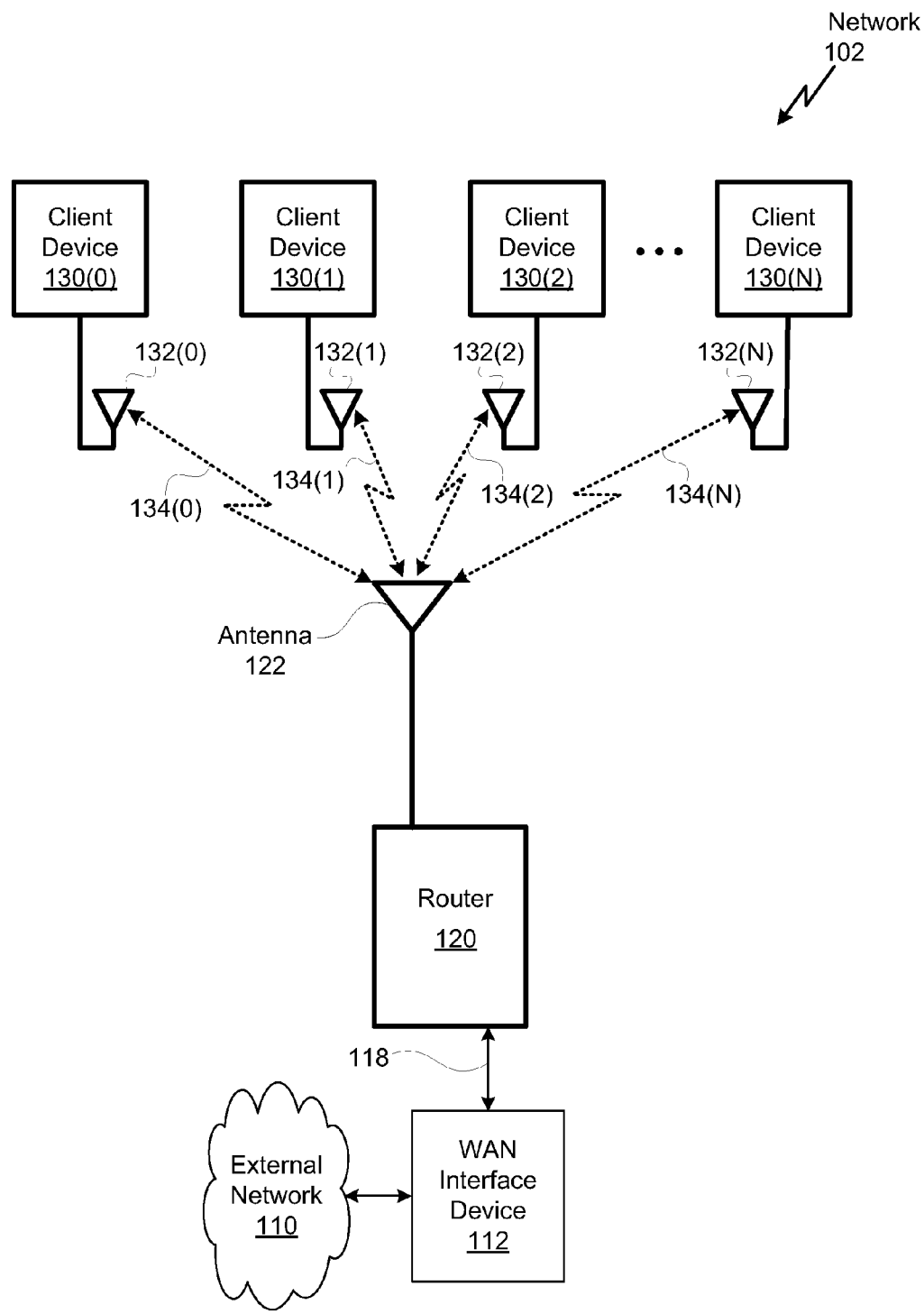
FIG. 1 illustrates a computer network, according to one embodiment.

Embodiments presented in this disclosure include a method and computer program product for configuring a network device that broadcasts a network device identifier. This method and computer code may generally include comparing the network device identifier to at least one previously detected network device identifier. If the network device identifier matches the at least one previously detected network device identifier, the method and computer code present for display a first interface for configuring the network device associated with the matched network device identifier. Moreover, the match indicates that the network device was previously configured and subsequently reset. Otherwise, the method and computer code present for display a second interface that prompts a user to select the network device to configure.

Description of Example Embodiments

Embodiments presented in this disclosure provide techniques for saving a basic service set identification (BSSID) that distinctly identifies a network device—e.g., a router. A network router typically includes one or more physical access points that may be divided into one or more logical entities—referred to as virtual access points (VAP). The router broadcasts beacons associated with these physical or virtual access points. The broadcast beacons include a BSSID that distinctly identifies the router. The BSSID is a 48-bit (6 byte) identifier that identifies either a virtual or physical wireless access point. In one embodiment, a setup application saves the BSSID during the initial configuration of the router. This saved BSSID indicates that the router has previously been configured. After the router is reset—i.e., one or more user-configurable settings are changed to their default settings—a user may execute the setup application to reconfigure the router. The setup application may compare the BSSID being broadcasted by the router with the BSSID stored in the memory. If the BSSIDs match, the setup application may automatically select the router without user input. For example, if there is a plurality of potential wireless routers found by the setup application, the user does not have to select which of the network devices the user is attempting to configure. Because the router was previously configured, the setup application assumes that the user is attempting to reconfigure a router that has been reset, thereby minimizing the amount of input that is needed from the user. Alternatively, the setup application may prompt the user to confirm that they desire to reconfigure a previously configured (but now reset) network router.

In one embodiment, the setup application may reconfigure the router using saved settings. For example, before the reset, the setup application or client device may save the current user-configurable settings of the router. Which settings are saved may be determined automatically by the setup application or by the user. Following the reset, in one embodiment, the setup application may reconfigure the router using at least one of the saved settings without input from the user. Alternatively or additionally, the setup application may prompt the user to determine which of the saved settings to apply when reconfiguring the reset router.

FIG. 1 illustrates a network 102, according to one embodiment. As shown, the network 102 comprises a router 120, one or more client devices 130, and a WAN interface device 112 coupled to the external network 110. The WAN interface device 112 may implement a cable modem, digital subscriber line (DSL) modem, fiber to the home interface, or any other technically feasible device that provides digital network connectivity to the external network 110. The WAN interface device 112 is coupled to the router 120 via a network interface 118. In one embodiment, the network interface 118 implements the well-known Ethernet standard.

The router 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured to establish wireless client links 134 to antennas 132 coupled to corresponding client devices 130. The router 120 may implement Ethernet layer 2 switching for wireless data frames forwarded among client devices 130 as well as internet protocol (IP) layer 3 routing between an IP domain associated with the smart network 102 and the external network 110. In this configuration, the router 120 provides related services and protocols, such as Dynamic Host Configuration Protocol (DHCP), network address translation (NAT), and the like.

Although a router 120 is shown, the disclosure is not limited to such, but rather any network device (e.g., bridge, switch, etc.) that performs the functions described herein is contemplated by this disclosure. Similarly, the techniques discussed in this disclosure are not limited to client devices 130 that wirelessly connect to a router, but may be any computing device that performs the functions described herein by connecting wirelessly or by wire to a network device.

Figure 2:
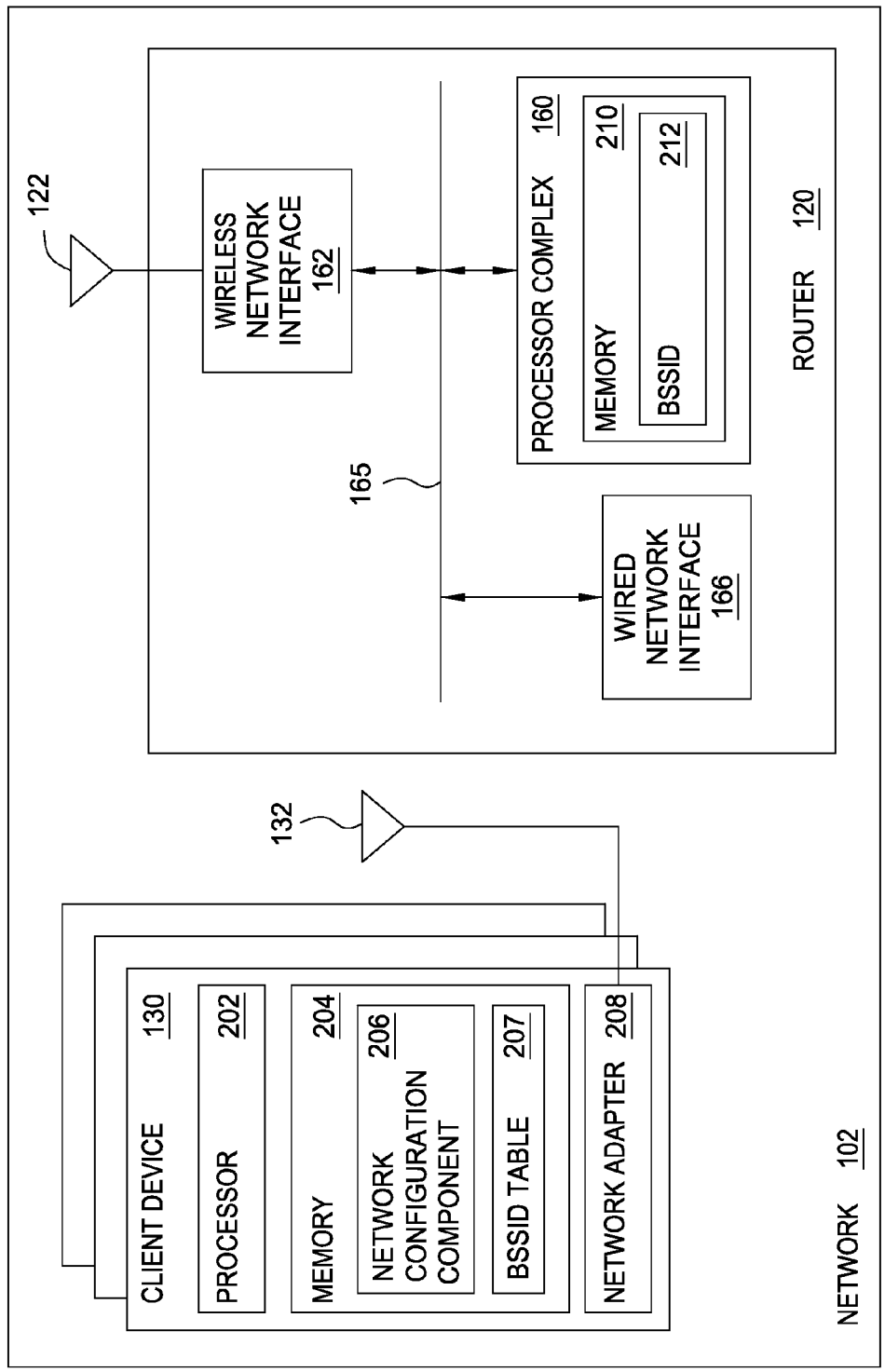
FIG. 2 illustrates the network of FIG. 1, according to one embodiment.

FIG. 2 is a system diagram of the network 102, according to one embodiment. Like the system illustrated in FIG. 1, a plurality of client devices 130 may wirelessly connect to a smart network host device 120. Each client device 130 also includes a processor 202, memory 204 and network adapter 208. The processor 202 may be a central processing unit (CPU) while the network adapter 208 may be a network interface controller or card. Moreover, the network adapter 208 may be communicatively coupled to the router 120 via the antenna 132.

Memory 204 may include non-volatile memory for storing persistent programs, program state, and configuration information as well as random access memory (RAM) for storing temporary or volatile data. The memory 204 stores a network configuration component 206 (i.e., a setup application) that is capable of configuring both the router 120 and the client device 130 that is executing the setup application. Specifically, the network configuration component 206 may cause the client device 130 to send messages or commands to the router 120. Further, the network configuration component 206 may use a display device and I/O devices (not shown) attached to the client device 130 to transmit information to and receive instructions from a user of the client device 130. In this manner, the network configuration component 206 may configure a portion of the network 102.

The network configuration component 206 may be developed in any number of programming languages capable of performing operations necessary to implement an embodiment of the present disclosure. The network configuration component 206 may include configuration settings that are encoded using, for example, Extensible Markup Language (XML) format. In other embodiments, the network configuration component 206 and configuration settings could be provisioned in another component or element such as a wireless network adapter, which could be provided to a client device 130 to be configured in network 102. The network configuration component 206 may provide prompts to the user and receive information from the user via a user interface displayed on the display device.

As shown, the memory 204 also includes a BSSID table 207, which may store a record for each router that has been previously configured using the setup application executing on the client device 130. In one embodiment, the BSSID table 207 may provide a list of BSSIDs that each represents a network device (e.g., router 120) that was configured by the network configuration component 206 executing on the client device 130.

The router 120 comprises a processor complex 160, a wireless network interface 162 and a wired network interface 166. An interconnect 165 is configured to transmit data among the processor complex 160, wireless network interface 162, and wired network interface 166. The wired network interface 166 is configured to transmit data packets via network interface 118 based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122. In one embodiment, the router 120 may include a wireless network interface for connecting to the network interface 118.

The processor complex 160 comprises a central processing unit (CPU), memory 210, and an interface to the interconnect 165. In one embodiment, the processor complex 160 is configured to execute an operating system and applications that provide routing services (e.g., packet forwarding engine for layer 3 traffic). The routing services may include, for example, data packet forwarding between the network interface 118 and the wireless network interface 162. The packet forwarding services may include, without limitation, bridging among one or more network devices via the wireless network interface 162.

Memory 210 may comprise non-volatile memory for storing persistent programs, program state and configuration information, random access memory (RAM) for storing temporary or volatile data. The memory 210 may contain one or more BSSIDs 212.

In certain embodiments, the router 120 comprises one or more integrated circuits that implement respective functions of the router 120. For example, the processor complex 160, wired network interface 166 and wireless network interface 162 may be integrated into a single integrated circuit. Moreover, the firmware that controls these components in the router 120 may be stored in an application specific integrated circuit or a field-programmable gate array.

Broadcasting Multiple BSSIDs

The router 120 may be able to broadcast multiple beacons, each of which representing a different virtual access point (VAP) that connects to the same IP network. Many network devices act as central points between a wireless network (e.g., network 102) and a wired network (e.g., the Internet). A VAP is a logical wireless network access point provided by a physical access point of a router. When a single physical access point supports multiple virtual access points, each virtual access point appears to computing devices to be an independent physical access point. Each VAP in a single physical access point may advertise a distinct identifier—a service set identification (SSID)—in a beacon. Alternatively, multiple virtual access points can advertise the same SSID but each have a different capability set—e.g., a basic service set (BSS)—which allows access to the IP network to be provided via diverse security schemes. Through virtual access points, a single provider may offer multiple services, as well as enabling multiple providers to share the same physical infrastructure.

Furthermore, a network device may broadcast multiple beacons that are each associated with a VAP using only one radio (i.e., the wireless network interface 162 and antenna 122). The radio transmits each beacon at a beacon interval (e.g., typically 100 milliseconds). Moreover, the VAPs for a single physical access point may be distributed on a single band or among multiple bands—e.g., 2.4 GHz and 5 GHz frequency bands.

A beacon associated with each VAP may include a BSSID for advertising the particular BSS of the VAP. As noted, a BSSID is a 48-bit (6 byte) identifier that identifies either a virtual or physical wireless access point. In one embodiment, each VAP may be associated with a BSSID that distinctly identifies the VAP. Thus, multiple VAPs associated with single physical access point may be distinctly identified based on their respective BSSIDs. In another embodiment, the BSSID is based on the MAC address of the physical access point—i.e., the MAC address of the network interface card of the router 120. In this embodiment, each VAP associated with the physical access point may share the same (or similar) BSSID. Nonetheless, in either embodiment, the broadcasted BSSIDs associated with the router 120 are distinct relative to a BSSID that may be broadcasted by any other network device. In this manner, the BSSID may be used to distinctly identify network devices. Moreover, BSSIDs are not configurable by the user and do not change if the router 120 is reset.

In one embodiment, the router 120 may broadcast multiple VAPs, each with a respective beacon that includes a BSSID and SSID. For example, one VAP may be the standard or user VAP that is initially assigned the default SSID (e.g., CISCOXXXXX or Linksys) which is then typically changed by a user of the client device 130. A second VAP—i.e., the setup VAP—may be assigned a predetermined SSID that indicates a state of the setup VAP. Other VAPs may include a guest VAP and EDAL VAP. Each of these VAPs may be logical entities of the same physical access point of the router 120.

Identifying a Previously Configured Network Device

Figure 3:
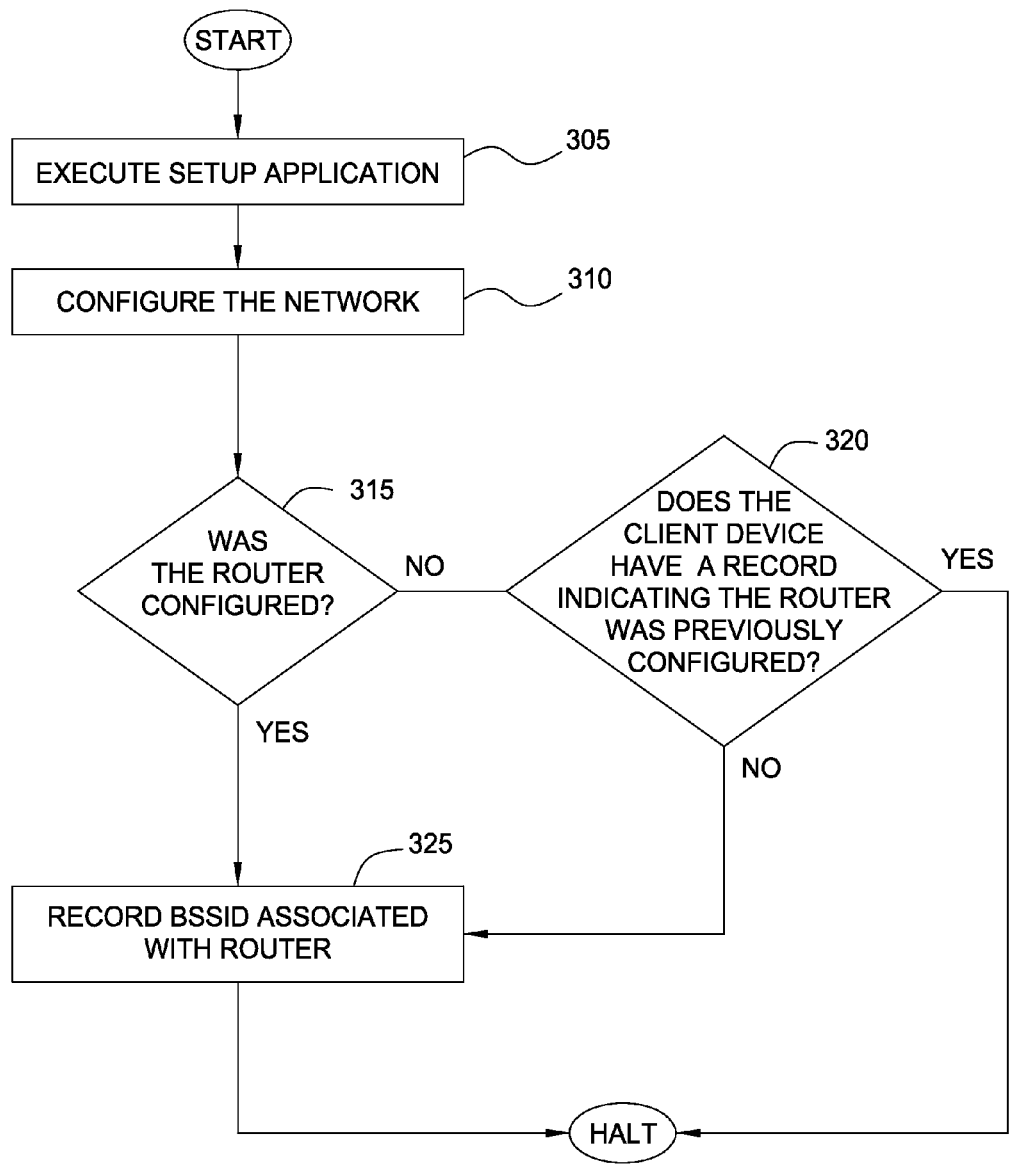
FIG. 3 is a flow chart illustrating a technique of identifying a router using a BSSID, according to embodiments of the disclosure.

FIG. 3 is a flow chart illustrating a technique of identifying a router using a BSSID, according to embodiments of the invention. At step 305, the network configuration component 206 is executed on the client device 130. In one embodiment, the network configuration component 206 may be software encoded on a portable read-only computer-readable storage medium such as a CD- or DVD-rom. In another embodiment, the network configuration component 206 may be software encoded on a writable computer-readable storage medium such as a compact disk, flash drive, and the like. Alternatively, the network configuration component 206 may be loaded onto the client device 130 using a wired or wireless connection. In such a case, the router 120 itself may be configured to provide the setup application which is installed and executed on the client device 130 as part of the process for configuring that router.

At step 310, the client device 130 may use the network configuration component 206 to connect the client device 130 to the router 120. If the router 120 has not previously been configured, then the network configuration component 206 may configure both the router 206 and the client device 130.

Configuring the router 120 may include establishing an administrative username and password, a network name or SSID to replace the default SSID, a network password (i.e., security key or passphrase), a security setting (i.e., Wired Equivalent Privacy (WEP) encryption or Wi-Fi Protected Access (WPA and WPA2) encryption), a time zone, a Dynamic Host Configuration Protocol (DHCP) service, port forwarding, and the like. If the network configuration component 206 determines that the router 120 has not previously been configured—e.g., the component 206 determines that the user VAP is set to the default SSID—the network configuration component 206 may assume that the client device 130 is also not configured. The network configuration component 206 may then configure the client device 130 to connect to the router 120. Moreover, the network configuration component 206 may install additional software (i.e., a client application) on the client device 206 to provide the user with an application to change the settings of the client device 130 and router 120.

At step 315, the network configuration component 206 determines if the settings of the router 120 were configured. If so, then at step 325 the network configuration component 206 stores the BSSID 212 associated with the router 120 in the BSSID table 207. As mentioned previously, the BSSID 212 distinctly identifies the router 120. The network configuration component 206 may store one or more of the BSSIDs from a VAP or physical access point associated with the router 120, for example, the user VAP or the setup VAP. In one embodiment, the network configuration component 206 only stores the BSSID 212 associated with the user VAP of the router 120—i.e., the VAP that broadcasts a SSID that is configurable by the user of the client device 130.

Although the BSSID table 207 and network configuration component are shown as stored in memory 204 of the client device 130, in one embodiment, the BSSID table 207 may be stored in computer-readable storage medium that contains the network configuration component 206. For example, the network configuration component 206 may be encoded on a writable computer-readable storage medium such as a flash drive. Once the network configuration component 206 determines that the router 120 was configured, the component 206 may store the BSSID 212 associated with the router 120 to a BSSID table in the writable computer-readable storage medium.

At step 320, the network configuration component 206 may determine whether the BSSID table 207 for the current client device 130 contains a record of the BSSID 212 of the router 120. If not, at step 325 the network configuration component 206 may store the BSSID 212 in the BSSID table 207. Accordingly, even if the network configuration component 206 configures the router 120 on a first client device 130 and is then subsequently executed on a second client device 130 with a different BSSID table 207, the network configuration component 206 may store the BSSID 212 in the BSSID table 207 of the second client device 130. In this manner, each client device 130 configured to connect to the router 120 may have a record indicating that the router 120 was previously configured.

Alternatively, if the BSSID table 207 is stored in the writable computer-readable storage medium that also contains the network configuration component 206, the component 206 may skip step 320 and store the BSSID 212 to the medium only when network configuration component 206 initially configures the router 120.

After the router 120 is configured and the BSSID 212 is stored in a BSSID table 212, the router 120 may be reset. In one embodiment, resetting the router 120 includes changing one or more settings of the router (i.e., the settings that were configured in step 310 of FIG. 3) back to their original or default settings. A factory reset is when the settings of the router 120 are changed back to the same default settings that existed on the router 120 when it was purchased by the user. A reset may be necessary when a router 120 becomes unresponsive even after cycling the power. Further, a reset may be voluntary if the user wants to reconfigure the router with different settings but wants to avoid manually ensuring that each setting is changed. In this embodiment, the router 120 could be reset and then reconfigured by the user to include only the settings she is interested in. One of ordinary skill in the art will recognize the different motivations for resetting a router such that one or more settings are reverted to the default settings. Moreover, a reset may be performed by activating a switch on the router 120 or by remote command via a wireless or wired connection.

Figure 4:
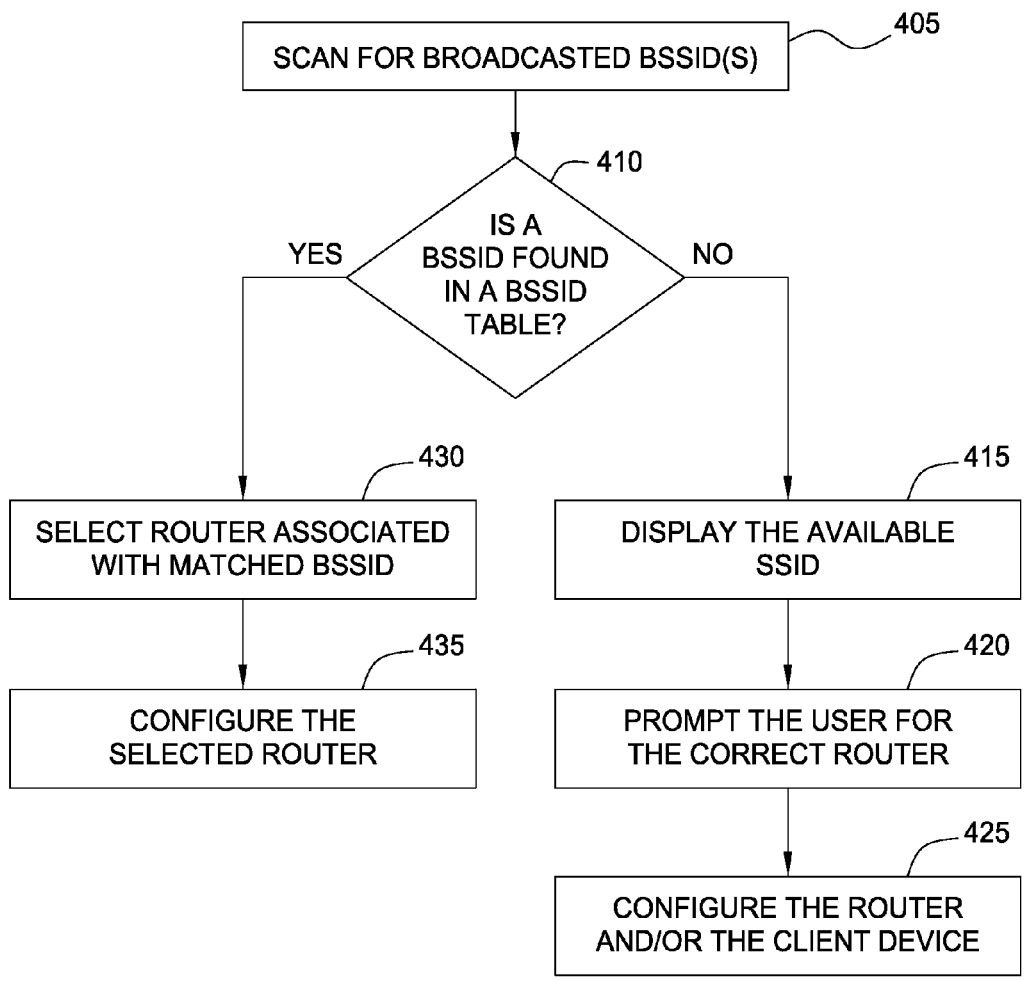
FIG. 4 is a flow chart illustrating a technique of identifying a router using a BSSID, according to one embodiment.

FIG. 4 is a flow chart illustrating a technique of identifying routers using BSSIDs, according to one embodiment. At step 405, a client device 130 may execute the network configuration component 206. The network configuration component 206 may scan (or poll) to discover all the broadcasted BSSIDs. For example, the router 120 may have one or more VAPs that each broadcast a beacon that contains a SSID and BSSID. The network configuration component 206 may receive the list of these BSSIDs from the network adapter 208.

At step 410, the network configuration component 206 then determines if one of the broadcasted BSSIDs matches a stored BSSID in the BSSID table 207. If so, the match indicates that the router associated with the BSSID was previously configured.

If a match is not found, at step 415 the network configuration component 206 may display to the user the broadcasted SSIDs. For example, the network configuration component 206 may scan to discover all the SSIDs associated with the BSSIDs. In one embodiment, the discovered SSIDs each correspond to a VAP of a router which provide access to an IP network—i.e., the Internet.

At step 415, the network configuration component 206 may then display the list of SSIDs for the user to select which SSID the user is attempting to configure or connect to. This display may be an interface that includes a graphical user interface (GUI) that is displayed on a display device connected to the client device 130.

At step 420, the network configuration component 206 prompts the user, using the interface, to select which SSID the user is attempting to either configure or connect to. In one embodiment, the user may have purchased a brand new router and is using the network configuration component 206 to configure both the router 120 and the client device 130. In this embodiment, the user may select an SSID that has a default setting—e.g., CISCOXXXXX or Linksys. The network configuration component 206 may then use the interface to step the user through the steps necessary to configure the router 120. In another embodiment, the user may have previously configured the router 120 and is attempting to configure one or more client devices 130 to connect to the router 120. The network configuration component 206 may then prompt the user to select the SSID that she is attempting to connect to using the client device 130.

At step 425, the network configuration component 206 receives the user selection. In one embodiment, if the user selects a router with a SSID that is different than the default setting, then the network configuration component 206 may assume that the selected router was previously configured and instead configure only the client device 130 to connect to the router. Alternatively, the network configuration component 206 may detect that the selected SSID is set to the default setting and configure both the router 120 and the client device 130. The network configuration component 206 then uses the interface to step the user through the steps necessary to configure the router 120 or the client device 130.

However, if a broadcasted BSSID does match an entry in the BSSID table 207, at step 430 the network configuration component 206 may select the router 120 associated with the matched BBSID without user input. That is, the network configuration component 206 may assume that the user is attempting to configure a router 120 that was previously configured but was subsequently reset. For example, the network configuration component 206 may have previously either configured the router using the client device 130 or configured the router 120 to connect to the client device 130. As shown in FIG. 3, the BSSID associated with the router 120 may have been stored in the BSSID table 207 of the client device 130. Subsequently, the router 120 may have been subjected to a reset that changed the user configurable settings, such as the SSID for the user VAP, port forwarding, security settings and the like, to their default settings. The BSSID, however, does not change after a factory reset. Saving the BSSID 212 in the BSSID table 207 allows the network configuration component 206 to determine that the client device 130 was previously configured to connect to the router 120. Accordingly, following the reset of the router 120, the network configuration component 206 may automatically select the router 120 as the network device user is intending to configure. For example, if there are multiple routers broadcasting multiple BSSIDs, the network configuration component 206 can select which router 120 the user is attempting to configure without user input.

Advantageously, using the stored BSSID 212 to automatically select which router to configure permits the network configuration component 206 to avoid, for example, prompting the user to determine which router out of a plurality of routers is correct—i.e., steps 415 and 420.

In one embodiment, the network configuration component 206 may adjust the interface based on whether the BSSID 212 from the router 120 matches a BSSID stored in the BSSID table 207. For example, a router that was reset may have the same default settings as a brand new router. However, a router that was reset may have the same settings as a brand new router but is not new to the user. Accordingly, instead of referring to the router as "new" in the interface, the network configuration component 206 may avoid confusion by referring to the router that was reset as, for example, a "reset" or "previously configured" router.

In one embodiment, if a match is detected but the selected router has not been reset, the client device 130 may use an interface to prompt the user to determine if the user is attempting to change the current configurations of the router 120 or the client device 130. For example, the client device 130 or network configuration component 206 may determine that the router 120 is already configured—e.g., a user SSID is different than the default SSID or the router 120 has been secured. If so, then the router 120 may not need to be configured using the network configuration component 206. In one embodiment, the client device 130 may use a different application to interact with the already configured router 120.

After the network configuration component 206 selects the router 120 associated with the matched BSSID, at step 435 the network configuration component 206 may use the interface to step the user through the steps necessary to reconfigure the previously reset router 120.

Figure 5:
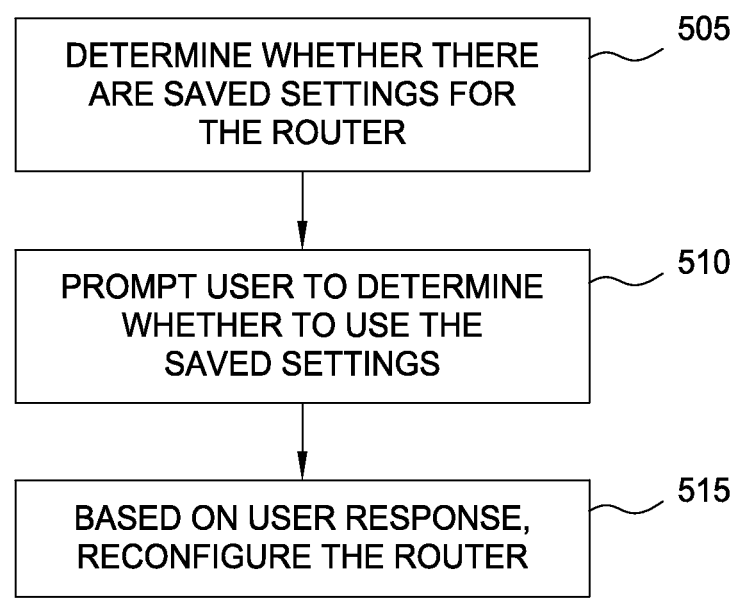
FIG. 5 is a flow chart illustrating a technique of reconfiguring a router with saved settings, according to one embodiment.

FIG. 5 is a flow chart illustrating the configuration of a previously reset router. For example, the steps in FIG. 5 are one embodiment of configuring the selected router as shown in step 435 of FIG. 4. In addition to automatically selecting the router using the broadcasted BSSID 212 and BSSID table 207, the network configuration component 206 may, at step 505, determine whether there are saved settings associated with the selected router 120. That is, before the router 120 was reset, the network configuration component 206 or client device 130 may have saved one of more settings of the router 120. These settings may include the user-configurable settings such as a network name, NAT settings, security settings, port forwarding and the like. Moreover, the settings may be stored, for example, in the memory 204 of the client device 130, on computer-readable medium associated with the network configuration component 206, or remotely in the external network 110. Further, the client device 130 or network configuration component 206 may periodically update the saved settings associated with the router 120. When attempting to reconfigure the router 120, the network configuration component 206 may use these saved settings to restore the router 120 to its previous functionality.

At step 510, the network configuration component 206 may determine there are saved configuration settings for the router 120 and prompt the user using an interface or GUI to determine which settings to install. In one embodiment, the save settings may include a group (or suite) of settings that are related to one aspect of configuring the router. For example, if the user wants to restore the original security settings of the router 120, the network configuration component 206 may configure the router with the saved security type (e.g., WEP or WPA), network password, administrator password, firewall and the like. This advantageously permits the user to select a group of configurable settings rather than selecting each setting individually.

In one embodiment, the network configuration component 206 may display one or more of the different groups that bundle related settings of the router 120. The user may then select only the groups she wants. Moreover, the interface may provide additional granularity that permits a user to select which particular settings within a group to apply to the router 120. For example, if the reason for the factory reset is because the user forgot the administrative password, she may choose to configure the router 120 with all the saved settings except for the administrative password. However, this disclosure is not limited to any particular technique of permitting the user to select which saved settings to restore to a router that was reset. One of ordinary skill will recognize that many different methods of grouping and selecting the saved settings.

In one embodiment, step 510 may be omitted such that the network configuration component 206 automatically restores all of the saved settings. For example, a user may instruct the network configuration component 206 which settings to save (or backup) when it configures the router 120 for a first time. Then, after the router 120 is reset, the network configuration component 206 may automatically restore the settings that the user defined. Alternatively, the network configuration component 206 may save the settings of the router 120 that do not prevent the user from accessing the router 120. That is, the network configuration component 206 may save all the user-configurable settings except for network passwords, an administrative password, an administrative username and the like. Following a reset and reconfiguration, the network configuration component 206 may automatically restore the saved settings but prompt the user to provide the settings that were not saved.

At step 515, the network configuration component 206 may reconfigure the router 120 using the settings selected by the user. Alternatively, the network configuration component 206 may configure the router 120 automatically using the saved settings without user input. In one embodiment, the network configuration component 206 may reconfigure the router 120 automatically for some settings but require user input before configuring others.

Generally, the present disclosure provides techniques for saving a BSSID that distinctly identifies a network device. In one embodiment, a setup application saves the BSSID when configuring the network device or a client device. The BSSID is then stored in memory to indicate that the router has previously been configured. After the network device is reset, the setup application may again be executed to reconfigure the network device. The setup application may compare the BSSID being broadcasted by the network device. If the BSSID matches one of the BSSIDs stored in memory, the setup application may automatically select the network device without user input. For example, if there is a plurality of potential network devices detected by the setup application, the user does not have to select which of the network devices the user is attempting configure. Because the router was previously configured, the setup application assumes that the user is attempting to reconfigure a router after it has been reset. Doing so minimizes the amount of input that is needed from the user.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for configuring a network device that broadcasts a network device identifier to a client device, comprising:
comparing, by one or more computer processors, the network device identifier to at least one previously detected network device identifier;
if the network device identifier matches the at least one previously detected network device identifier, presenting for display a first interface on the client device for configuring user-configurable settings in the network device associated with the matched network device identifier, wherein a match indicates that the network device was previously configured and subsequently reset such that the user-configurable settings of the network device were reset to default values, wherein the network device identifier and the at least one previously detected network device identifier are basic service set identifications (BSSID), and wherein the user-configurable settings were reset during a factory reset; and
otherwise, presenting for display a second interface on the client device that prompts a user to select the network device to configure.

2. The method of claim 1, wherein the network device is selected from a plurality of network devices that each broadcast a distinct network device identifier, and wherein the second interface prompts the user to select the network device from the plurality of network devices.

3. The method of claim 1 further comprising, before comparing the network device identifier to at least one previously detected network device identifier:
configuring the network device; and
storing the previously detected network device identifier associated with the network device, wherein the network device is reset after the previously detected network device identifier is stored.

4. The method of claim 3, further comprising:
before the network device is reset, storing at least one setting associated with the network device; and
after the network device is reset and if the match is found, outputting for display the at least one setting in the first interface, the first interface prompting the user to restore the network device based on the at least one setting.

5. The method of claim 1, wherein the first interface includes text or a graphic that indicates that the network device was previously configured.

6. The method of claim 1, wherein, if the match is determined, the network device associated with the matched network device identifier is selected without user input.

7. The method of claim 1 further comprising, before comparing the network device identifiers to at least one previously detected network device identifier:
storing at least one setting associated with the network device; and
after storing the at least one setting and if the network device identifier matches the at least one previously detected network device identifier, restoring the selected network device based on the at least one setting.

8. The method of claim 7, wherein the first interface includes the at least one setting and prompts the user to select the at least one setting.

9. The method of claim 7, wherein configuring the selected network device based on the at least one setting is performed without user input.

10. A computer program product for configuring a network device that broadcasts a network device identifier to a client device, comprising:
computer code that compares the network device identifier to at least one previously detected network device identifier;
computer code that, if the network device identifier matches the at least one previously detected network device identifier, presents for display a first interface on the client device for configuring user-configurable settings in the network device associated with the matched network device identifier, wherein a match indicates that the network device was previously configured and subsequently reset such that the user-configurable settings of the network device were reset to default values, wherein the network device identifier and the at least one previously detected network device identifier are basic service set identifications (BSSID), and wherein the user-configurable settings were reset during a factory reset; and
computer code that, otherwise, presents for display a second interface on the client device that prompts a user to select the network device to configure; and
a non-transitory computer readable medium that stores the computer code.

11. The computer program product of claim 10, wherein the network device is selected from a plurality of network devices that each broadcast a unique network device identifier, and wherein the second interface prompts the user to select the network device from the plurality of network devices.

12. The computer program product of claim 10 further comprising computer code that, before comparing the network device identifiers to at least one previously detected network device identifier:
configures the network device; and
stores the previously detected network device identifier associated with the network device, wherein the network device is reset after the previously detected network device identifier is stored.

13. The computer program product of claim 12, further comprising:
before the network device is reset, storing at least one setting associated with the network device; and
after the network device is reset and if the match is found, presenting for display the at least one setting in the first interface, the first interface prompting the user to restore the network device based on the at least one setting.

14. The computer program product of claim 10, wherein the first interface includes text or a graphic that indicates that the network device was previously configured.

15. The computer program product of claim 10, wherein if the match is determined, the network device associated with the matched network device identifier is selected without user input.

16. The computer program product of claim 10 further comprising computer code that, before comparing the network device identifiers to at least one previously detected network device identifier:
stores at least one setting associated with the network device; and after storing the at least one setting and if the network device identifier matches the at least one previously detected network device identifier, restores the selected network device based on the at least one setting.

17. The computer program product of claim 16, wherein the first interface includes the at least one setting and prompts the user to select the at least one setting.

18. The computer program product of claim 16, wherein configuring the selected network device using the at least one setting is performed without user input.

* * * * *